Aug. 18, 1970  D. L. A. DUFF  3,525,100

COMMUTATION CIRCUIT FOR INVERTER MOTOR CONTROL SYSTEM

Filed Aug. 3, 1967  2 Sheets-Sheet 1

Inventor:
David L. A. Duff
By Dawson, Tilton,
Fallon and Lungmus
Attys.

United States Patent Office 3,525,100
Patented Aug. 18, 1970

3,525,100
COMMUTATION CIRCUIT FOR INVERTER MOTOR CONTROL SYSTEM
David L. A. Duff, Evanston, Ill., assignor, by mesne assignments, to FMC Corporation, San Jose, Calif., a corporation of Delaware
Filed Aug. 3, 1967, Ser. No. 658,144
Int. Cl. H02p 7/62
U.S. Cl. 318—227                           4 Claims

ABSTRACT OF THE DISCLOSURE

A three-phase, fixed-frequency AC supply is coupled to a rectifier network which produces a DC voltage. A commutation circuit and an inverter, controlled by a logic network, generate a three-phase, variable-frequency voltage for controlling the speed of an induction motor. The commutation circuit includes two series inductors coupling the positive and negative terminals of the rectifier respectively to the positive and negative common terminals of the inverter. The anodes of the regenerating diodes associated with the positive bank of thyristors of the inverter are clamped to the negative output terminal of the rectifier; and he cathodes of the regenerating diodes associated with the negative bank of thyristors of the inverter are clamped to the positive output terminal of the rectifier. At the time of commutation, means are provided for swiching a capacitor having a reverse charge between the common terminal of the inverter bank being commutated and the complementary terminal of the rectifier. Thus, the load current is transferred from two conducting thyristors to their associated regenerating diodes; the forward voltage is removed from the conducting thyristors to allow them to recover their forward blocking ability; and a reverse potential is applied to the conducting thyristor to remove existing charge and shorten the cutoff time.

BACKGROUND

Figure 1:
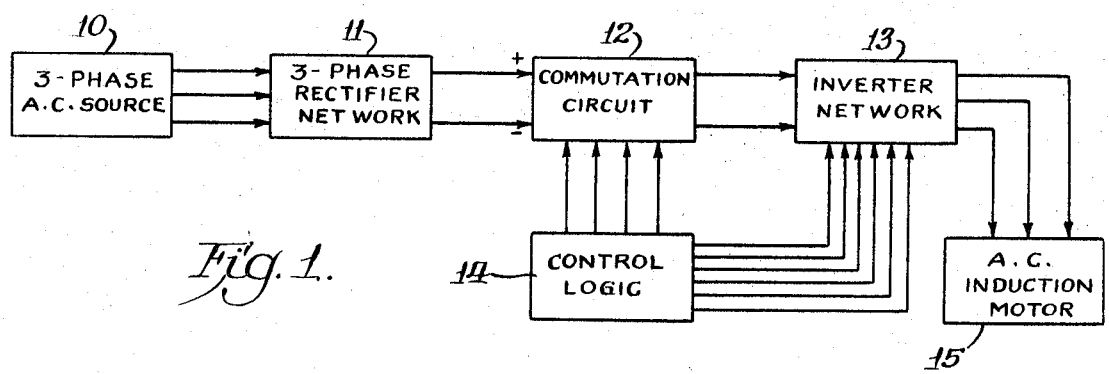

The present invention relates to a system for controlling the speed of an AC induction motor; more particularly, it relates to a control system for controlling the speed of an AC induction motor by varying the frequency of its supply voltage.

Systems are known for controlling the speed of an AC induction motor by varying the frequency of its supply voltage. In such systems, it is common to rectify the output voltage of a conventional three-phase, fixed-frequency AC supply to generate a DC voltage. An inverter is then supplied with this DC voltage and generates a three-phase AC signal for energizing the motor. A commutation circuit is associated with the inverter for transferring the DC current from the inverter to an alternate path during switching of the branches in the inverter.

Previous speed control systems of this kind have not been commercially successful principally because of the complexity and unreliability of the commutation circuit. The commutation circuit presents a particularly difficult problem in that not only must it transfer the load current from a conducting thyristor or similar controlled switch in the inverter to an alternate path, but it must also remove the voltage from the commutated switching devices in the inverter and supply a reverse voltage for sweeping out residue charge in the switching devices to provide a fast cutoff.

SUMMARY

In the present invention, there is provided a commutation circuit having first and second inductors connected in series respectively between the positive and negative terminals of the rectifier and the positive and negative common terminals of the inverter. The inverter, which is otherwise conventional, has the anodes of the regenerating diodes associated with its positive bank of thyristors clamped to the negative output terminal of the rectifier. The cathodes of the regenerating diodes associated with the negative bank of thyristors in the inverter are clamped to the positive output terminal of the rectifier.

During commutation, a capacitor is switched across the terminals of the thyristors in the inverter which are being shut off, and the capacitor is also switched in circuit with one of the series inductors of the commutation circuit which had been conducting the load current. The load current that had been flowing in the commutation circuit then charges this capacitor. Since one side of the capacitor is, in effect, referenced to the other rectifier terminal and to a terminal of the thyristors being shut off, a reverse bias is applied across these thyristors for shutting them off very rapidly. During this time, the load current in the motor continues to circulate through the regenerating diodes and through the complementary one of the inductors.

After the thyristors being commutated in the inverter are shut off and the current in the inductor charging the capacitor returns to normal, the capacitor is then switched out of circuit with the inverter and the inverter assumes a new state for advancing the phase of the supply voltage to the induction motor.

By thus providing a very simple yet efficient and reliable commutation circuit for transferring the load current during the shutting off of the inverter thyristors, the instant invention has overcome the above-described difficulties associated with prior systems for controlling the speed of an induction motor by varying its source frequency.

Other advantages and features of the instant invention will be obvious to persons skilled in the art from the following detailed description of a preferred embodiment accompanied by the attached drawing.

THE DRAWING

Figure 2:
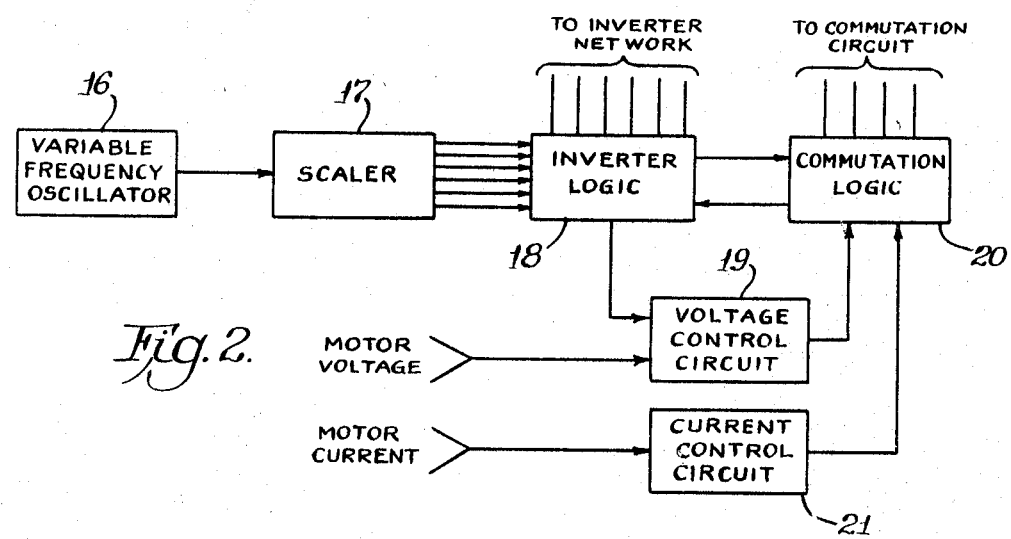
Figure 4:
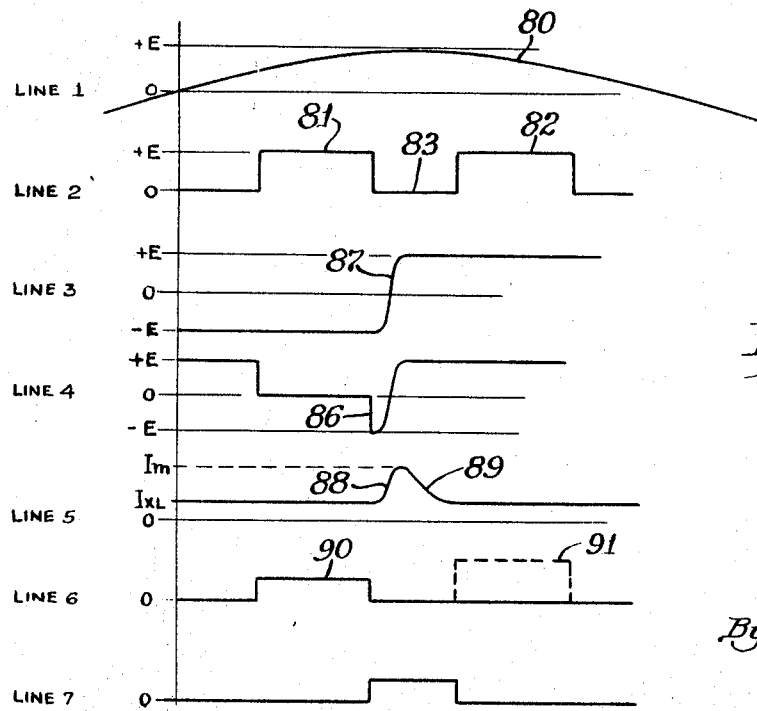
Figure 3:
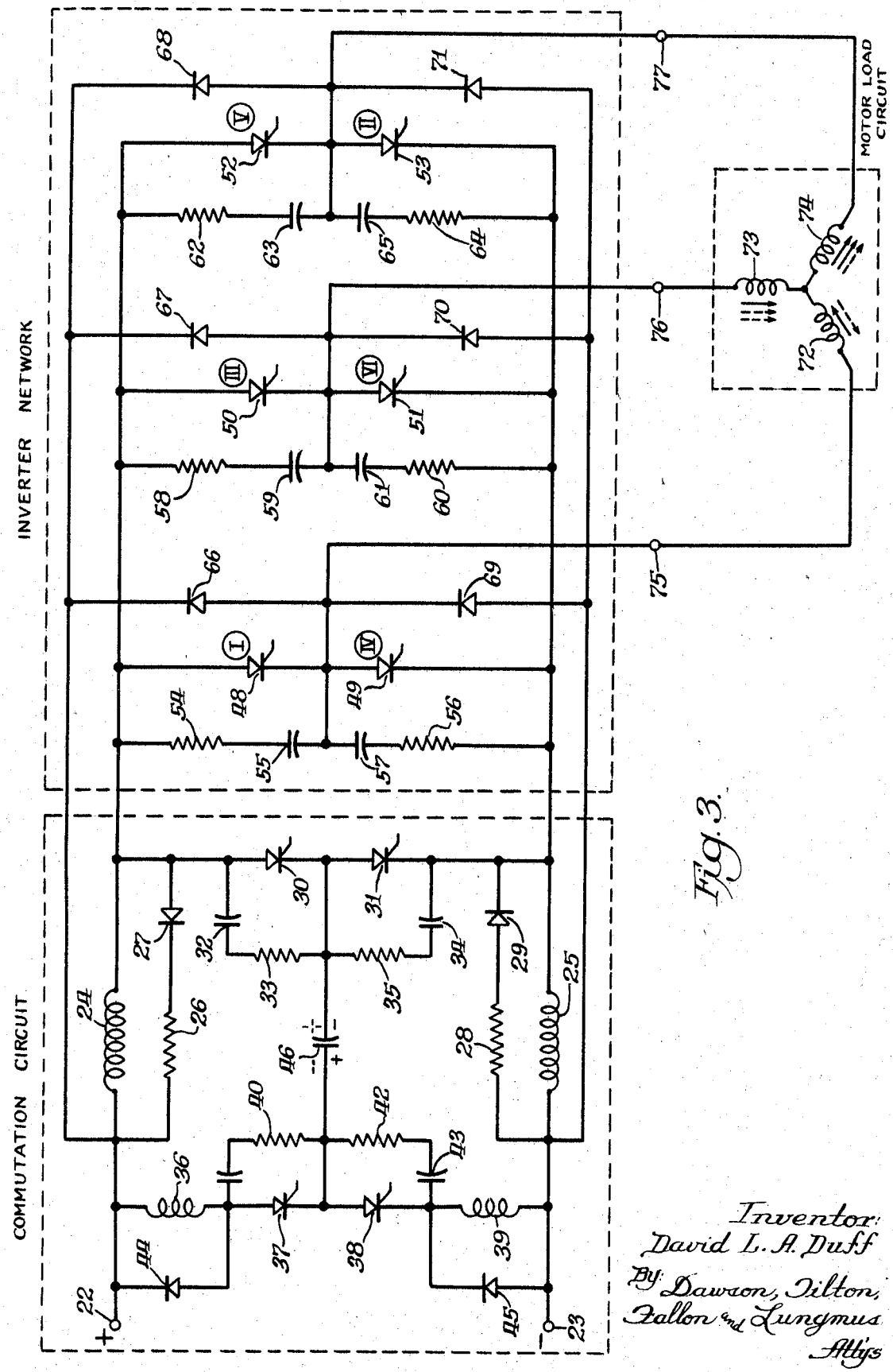

FIG. 1 is a functional block diagram of a motor control system according to the present invention;
FIG. 2 is a more detailed functional block diagram of the control logic of the system of FIG. 1;
FIG. 3 is an idealized timing diagram showing various currents and voltages in the system of FIG. 1 and their respective time relation; and
FIG. 4 is a detailed circuit schematic of the commutation circuit, inverter and induction motor of the system of FIG. 1.

DETAILED DESCRIPTION

Referring now to FIG. 1, a three-phase fixed-frequency AC source 10 supplies energy to a conventional three-phase rectifier network 11. The rectifier network 11 generates from the AC voltage a steady-state DC voltage.

The DC voltage from the rectifier network 11 is coupled to the input terminals of a commutation circuit 12 which, in turn, feeds an inverter network 13. Control logic, generally represented in block form and indicated by reference numeral 14 controls the commutation circuit 12 and the inverter network 13 to generate a three-phase, variable frequency current at the output of the inverter network 13 to drive a conventional AC induction motor 15. The speed of the induction motor 15 is controlled by the frequency of the output signal of the inverter network 13 which, in turn, is controlled by the control logic 14 presently described in greater detail.

FIG. 2 shows the control logic in greater detail. A variable frequency oscillator 16 feeds a conventional scaler 17 which counts down the output frequency of the oscillator 16 by a factor of 6 and generates separate output pulses on each of six separate output lines. The pulse on each successive line has a phase lag relative to the preceding pulse of 60 electrical degrees. That is to say, the six output lines from the scaler 17 contain binary pulses, each of 180° duration; and the leading edge of a succeeding pulse lags the leading edge of the pulse on the preceding line by 60 electrical degrees. Leading edges of successive pulses on any given line define one complete cycle of the AC energy ultimately fed to the induction motor 15. The frequency of the oscillator 16 may be set manually or it may be controlled by an electrical signal, either of which methods are commonly known.

The six output lines from the scaler 17 are coupled to the input of the inverter logic, generally designated 18, and the inverter logic feeds a voltage control circuit 19, the output of which is fed to the commutation logic, generally designated 20. A current control circuit 21 is responsive to the amplitude of motor current and it also controls the commutation logic 20.

The commutation logic generates inhibit pulses which are fed to the inverter logic along the two separate lines shown in the drawing; and these inhibit pulses inhibit the output pulses on the output lines of the inverter logic 18 which are fed to the inverter network 13. The pulses occurring on the output lines of the inverter logic 18 are identical to the input pulses received from the scaler 17 except for this inhibit period, that is, each output line carries a pulse having a duration of 180 electrical degrees and the leading edge of each succeeding pulse trails the leading edge of the preceding pulse by 60 electrical degrees. However, the output pulses from the inverter logic are interrupted as controlled by the output of the commutation logic 20 for a period of time sufficient to commutate one bank of the thyristors in the inverter circuit to their blocking state, as will be described in more detail below.

The commutation logic 20 also generates four output pulses on the lines indicated in the drawing as being fed to the commutation circuit 12; and these output lines from the commutation logic 20 carry the signals which control the gating of the thyristors in the commutation circuit, as described more clearly below.

Turning now to FIG. 3, a detailed circuit schematic is shown for the commutation circuit 12, the inverter network 13 and the motor. First and second input terminals 22 and 23 of the commutation circuit receive respectively the positive and negative voltage from the rectifier network 11. A first inductor 24 is connected in series between the input and output terminals of the commutation circuit. A second inductor 25 is connected in series between the input and output negative terminals of the commutation circuit. A resistor 26 and a conventional diode 27 are connected in series acros the inductor 24 with the anode of the diode 27 connected to the output terminal of the commutation circuit. Similarly, a resistor 28 and a diode 29 are connected arross the inductor 25; however, the cathode of the diode 29 is connected to the output negative terminal of the commutation circuit.

First and second thyristors 30 and 31 are connected in series across the output terminals of the commutation circuit with the anode of the thyristor 30 connected to the output positive terminal of the commutation circuit. A circuit for suppressing surge currents including a capacitor 32 and series resistor 33 is connected in parallel with the thyristor 30; and a similar surge suppression circuit including a capacitor 34 and a resistor 35 are connected in series across the thyristor 31.

Across the input terminals of the commutation circuit there are connected in series an inductor 36, a thyristor 37 (the anode of which is connected to the inductor 36), a thyristor 8 (the anode of which is connected to the cathode of thyristor 37) and an inductor 39. A resistor 40 and series capacitor 41 are connected across thyristor 37 for suppressing surge current; and a similar resistor 42 and series capacitor 43 are connected across thyristor 38 for suppressing surge currents. A diode 44 is connected across inductor 36 with the cathode of the diode 44 connected to the input positive terminal of the commutation circuit; and a similar diode 45 is connected across inductor 39 with the anode of the diode 45 connected to the input negative terminal 23 of the commutation circuit. A capacitor 46 is connected between the common junction of thyristors 37 and 38 and the common junction of thyristors 30 and 31.

With the commutation circuit thus described in detail, it will be more illustrative to describe the inverter network in detail and then to explain the operation of the system during a typical half cycle of operation. In general, the inverter network is conventional in that a three-phase thyristor bridge circuit is connected back-to-back with a three-phase diode bridge circuit. Each of the diodes is associated with one of the thyristors and acts as an alternate current conduction path when its associated thyristor is being commutated; hence it regenerates the load current during the commutation.

Still referring to FIG. 3, a thyristor 48 and a thyristor 49 are connected in series across the input terminals of the inverter network with the anode of thyristor 48 connected to the input positive terminal and the cathode of the thyristor 40 connected to the input negative terminal of the inverter network. Similarly, a thyristor 50 and a thyristor 51 are connected in series across the input terminals of the inverter network with the anode of thyristor 50 connected to the input positive terminal. A third branch of thyristors including a thyristor 52 and a thyristor 53 are similarly connected in series across the input terminals of the inverter network.

A surge suppression circuit including a resistor 54 and a series capacitor 55 are connected across the thyristor 48. A surge suppression circuit including a resistor 56 and a series capacitor 57 are connected across thyristor 49. A surge suppression circuit including a resistor 58 and a series capacitor 59 are connected across the thyristor 50. A surge suppression circuit including a resistor 60 and a series capacitor 61 are connected across the thyristor 51. A surge suppression circuit including a resistor 62 and a series capacitor 63 are connected across the thyristor 52. A surge suppression circuit including a resistor 64 and a series capacitor 65 are connected across the thyristor 53.

A diode 66 has its anode connected to anode of the thyristor 49 and its cathode connected to the input positive terminal 22 of the commutation circuit. A diode 67 has its anode connected to the anode of thyristor 51 and its cathode connected to the input positive terminal 22 of the commutation circuit. A diode 68 has its anode connected to the anode of thyristor 53 and its cathode connected to the input positive terminal 22 of the commutation circuit.

A diode 69 has its anode connected to the input negative terminal 23 of the commutation circuit and its cathode connected to the cathode of thyristor 48. A diode 70 has its anode connected to the input negative terminal 23 of the commutation circuit and its cathode connected to the cathode of thyristor 50. The diode 71 has its anode connected to the input negative terminal 23 of the commutation circuit and its cathode connected to the cathode of thyristor 52.

The induction motor is shown in FIG. 3 as having a Y-connected, three-phase stator winding including branches 72, 73, and 74. The input terminals of the motor, that is, the connections respectively to the windings 72, 73 and 74 are designated as 75, 76 and 77. The common terminal of thyristor 48 and thyristor 49 in the inverter are connected to terminal 75 of the induction motor. The common terminal of thyristors 50 and 51 of the inverter is connected to terminal 76 of the motor. The common terminal of thyristors 52 and 53 of the inverter is connected to the terminal 77 of the motor.

The explanation of the operation of the system will be facilitated by sometimes referring to the thyristors 48, 50 and 52 as the "positive bank" of thyristors in the inverter circuit (the anodes of all three thyristors being connected in common to the input positive terminal of the inverter). Similarly, the thyristors 49, 51 and 53 are sometimes referred to as the "negative bank" of the thyristors of the inverter. In addition, as will be made clear from the description of the operation of the system, that bank having two conducting thyristors is the one that will be commutated, and the load current will be transferred to the "set" of regenerating diodes associated with the commutated bank of thyristors. Of course, only two of the diodes will conduct current since only two thyristors of the bank had originally been conducting. For instance, suppose thyristor 52 is being shut off, in this case, load current had been flowing through thyristor 52, terminal 77 of the motor and winding of the motor. The load current in the winding 74 will continue; however, the current will not flow through thyristor 52, but rather, through its associated diode 71.

The gate leads of the four thyristors in the commutation circuit, namely, thyristors 30, 31, 37, and 38, receive their input or gating signals from the commutation logic 20 (FIG. 2); and the gate leads for the six thyristors in the inverter namely, thyristors 48, 49, 50, 51, 52, and 53 receive their input signals from the six output leads of the inverter logic 18 (FIG. 2).

OPERATION

The operation of the commutation circuit and inverter network will be explained in conjunction with the timing diagram of FIG. 4 which illustrates various voltages and currents in the system. For convenience, the firing order of the thyristors in the inverter is indicated adjacent each thyristor and by a roman numeral within a circle. It can be seen that the firing order of thyristors is as follows: thyristor 48 fires first and then in order, thyristors 53, 50, 49, 52, and 51.

On line 1 of FIG. 4 there is shown a portion of a sinusoidal waveform representing an idealized voltage waveform between terminals 75 and 77 of the motor, which, for reference purposes, will be considered as phase I of the three-phase voltage supplied to the motor. This sinusoidal waveform is identified by reference numeral 80 on the first line of FIG. 4.

During the first portion of this cycle, thyristors 48, 50, and 53 are conducting as signalled by their control leads from inverter logic 18 of FIG. 2. Hence, current is flowing from inverter logic 18 of FIG. 2. Hence, current is flowing into terminal 75 and 76 of the motor and out of terminals 77 of the motor. The currents which flow in the motor windings are illustrated by the solid arrows in FIG. 3. The actual voltage applied between the terminals 75 and 77 is indicated on line 2 of FIG. 4; and it is seen to be two step functions 81 and 82 occuring in sequence and separated by an intervening inhibit portion 83 which is generated by the previously-described inhibit pulses flowing from the commutation logic 20 to the inverter logic 18 in FIG. 2. As is conventional, the inhibit portion of the voltage illustrated on line 2 is normally derived from the voltage control circut 19 which determines the time between the application of the pulses 81 and 82 to the motor. The function of the inhibit pulse is to allow one bank of thyristors in the inverter circuit to be turned off so that one of the two conducting thyristors in this bank can be commutated. Under certain circumstances, the inhibit portion 83 may be derived from the current control circuit 21 which feeds the commutation logic 20 in FIG. 2 which, in turn, generates an inhibit pulse to the inverter logic 18. However, this only occurs when excess current is being fed to the motor; and this is a safety feature rather than a necessary portion of an operable system.

In the operation of the present three-phase inverter, although only one of the thyristors is going to be shut off, nevertheless, it has been found easier to remove the voltage from an entire bank (either positive or negative depending on which bank has two conducting thyristors) during the commutation period. The conducting thyristor in the complementary bank continues to conduct. In the present illustration and for the given firing order, it will be noted that thyristors 48 and 50 (firing order I and III) are conducting during the occurrence of pulse 81, and it is desired to shut off thyristor 48 and to turn on thyristor 49 (the latter having firing order IV). The currents flowing in the motor windings represented by this new state of applied voltages are represented by the dashed arrows alongside the respective motor windings.

At the beginning of the inhibit portion 83 of the cycle, thyristors 30 and 38 in the commutation circuit are gated on, that is, they are switched to a conducting state. At this time, it may be assumed that the capacitor 46 had accumulated a charge of the polarity indicated by the solid plus and minus signs, and that the potential to which it charged is equal to the DC potential of the rectifier network 11, which potential will hereinafter be referred to as E.

When the thyristors 30 and 38 are gated on (since the inductance of inductor 39 is very much less than that of the inductor 24) there will in effect be a short circuit between the input positive terminal of the inverter and the input negative terminal 23 of the commutation circuit. This short circuit path comprises the conducting thyristor 30, capacitor 46, the conducting thyristor 38, and the small inductor 39. It will be noted that at this time, since the capacitor 46 had accumulated the charge shown by the solid plus and minus signs that the input positive terminal of the inverter will immediately go to a negative voltage (assuming that the input negative terminal 23 of the commutation circuit is at ground potential for convenience). This is shown at 86 on line 4 of FIG. 4 which is the voltage across thyristor 48. At the same time, the load current flowing through terminal 75 of the motor is commutated from the branch containing thyristor 48 to the branch containing diode 69, which is the regenerating diode associated with thyristor 48. In other words, the load current continues to flow in the same direction as the solid arrow in winding 72 except that the loop now includes diode 69, winding 72, winding 74, conducting thyristor 53, and the inductor 25 in the commutation circuit. This loop of current continues to flow even after the voltage has been removed because of the large inductive reactance in the loop. It will also be noted that the second loop of current continues to maintain its direction; however, since thyristor 50 is in the same bank as thyristor 48, the load current is transferred or commutated to its associated regenerating diode 70. This second loop of current now comprises diode 70, motor winding 73, motor winding 74, conducting thyristor 53, and the inductor 25. Since this loop also has a high inductive reactance, current will continue to flow after the voltage has been removed.

At this time, the firing voltage will already have been removed from the gates of the thyristors 48 and 50, and the large negative voltage across their respective terminals will very rapidly shut them off. In practice, the shut off time is typically of the order of 20 microseconds. This time is somewhat exaggerated in the idealized drawings of FIG. 4 for purposes of illustration. Referring again to the commutation circuit, it will be noted that when the thyristors 30 and 38 have been turned on as has been explained, the inductor 24 and the capacitor 46 define a series resonant circuit and the capacitor 46 will charge according to the sinusoidal waveform illustrated at 87 in line 3 of FIG. 4, the basic frequency of which is determined by the values of inductor 24 and capacitor 46. Hence, the input positive terminal of the inverter circuit will again rise to the positive voltage E. When the input positive terminal of the inverter reaches the voltage E, the diode 27 will be forward biased, and the excess current stored in inductor 24 will circulate around the loop comprising inductor 24, diode 27 and resistor 26. Hence, the additional energy stored in inductor 24 will be dissipated in resistor 26. This is illustrated in line 5 of FIG. 4 wherein the waveform 88 indicates the current charging the capacitor 46 and the curve 89 illustrates the decay of the current. The curve 89 has a time constant determined by the inductance of the inductor 24 and the resistance of resistor 26.

It will be noted that at the end of this charging time, the capacitor 46 will have been charged to a voltage E having polarity indicated by the dashed plus and minus signs in FIG. 3. In other words, during the next commutation period, this reverse charge on the capacitor 46 is advantageously applied across the complementary bank of thyristors in the inverter which are being commutated; and it supplies a source of energy for removing the forward voltage on the bank of thyristors containing the one to be commutated. At the same time, while removing the forward voltage from the conducting thyristors to turn them off, it provides a reverse potential for sweeping out existing charge and removing carriers from the thyristor junction to significantly speed up recovery or turn-off time of the thyristors.

During this application of the reverse charge stored in capacitor 46 to that bank of thyristors being commutated, the diodes associated with these thyristors clamp the thyristor to the terminal of opposite or complementary polarity of the rectifier network. That is to say, if the positive bank of thyristors in the inverter are being commutated, their associated regenerating diodes 69, 70 and 71 will clamp their respective cathodes to the negative terminal of the rectifier so that the charge on capacitor 46 as shown in solid line may be applied to reverse bias the thyristors 48, 50, and 52. Likewise, if one of the negative bank of thyristors in the inverter is being commutated, the regenerating diodes 60, 67, and 68 clamp anodes of these thyristors to the positive terminal of the rectifier so that the reverse bias indicated by dashed line on capacitor 46 may be applied to the thyristors 49, 51, and 53. The time taken for the capacitor to discharge to zero volts must be at least as great as the turn off time of the thyristors (typically 20 microseconds) in order to insure that the thyristors in fact will be turned off. The capacitor continues to charge, and would charge to a value of $2E$ if it were not for the forward biasing of the diode 27 to dissipate the excess energy stored in the inductor 24. During this same cycle, diode 45 serves a similar function for current-limiting inductor 39.

The small inductors 39 reduce the rate-of-rise of voltage ($dv/dt$) across the commutation circuit thyristors being turned on. The surge suppression network associated with thyristor 38, namely resistor 42 and capacitor 43, form a critically-damped series RLC network for slowing this rate-of-rise of voltage across thyristor 38. The other surge suppression networks perform a similar function for their associated thyristor.

Referring again to FIG. 4, line 5 indicates the current through the inductor 24 in the commutation circuit. The reference symbol $I_{XL}$ indicates the normal current supplied to the inverter, and $I_M$ indicates the maximum current through the inductor, that is, the current which charges the capacitor 46 to the polarity indicated in dashed line. Line 6 in FIG. 4 illustrates the current through the thyristors being commutated. In the example, the pulse of current 90 indicates the current through thyristors 48 and 50; and since thyristor 48 is not gated on thereafter, the dashed pulse 91 indicates the current only through the thyristor 50. This current is now twice its previous value. Line 7 of FIG. 4 illustrates the current through the regenerating diodes associated with the thyristor being commutated. Current flows through the associated diode during the inhibit period when the thyristors are shut off, as has already been discussed.

After commutation has been completed, thyristors 49 and 50 are turned on leaving the thyristors of firing order II, III, and IV conducting. The inverter output phase is advanced by 60 electrical degrees. It will be noted that at this time, the negative bank of the inverter bridge has two conducting thyristors. When commutation is again initiated, thyristors 49 and 53 in the inverter are commutated by gating thyristors 31 and 37 in the commutation circuit to an "on" position. It will be recalled that a potential of polarity as indicated by the dashed line and magnitude E will have built up on capacitor 46 during this switching cycle and it will be applied directly across thyristors 49 and 53 to reverse bias them; and their load currents will be transferred to the associated diodes 66 and 68 respectively.

The commutation circuit thus stores within itself the required energy of the proper polarity for subsequent commutation in phase with the inverter conduction pattern; and this energy is always applied to reverse bias that bank of the inverter bridge which contains two conducting thyristors.

Having thus described a specific embodiment of a variable-frequency induction motor control system according to my invention, it will be obvious to persons skilled in the art that certain of the circuit elements as well as some of the conventional functional blocks may be replaced while continuing to practice the invention. It is therefore intended that all such modifications and equivalent structures be covered as they are embraced within the spirit and scope of the appended claims.

I claim:

1. A control system for controlling the speed of a three-phase induction motor, comprising: a source of DC potential; a three-phase inverter network defining first and second input terminals and first, second, and third output terminals coupled to said motor, said inverter comprising a plurality of switching means including a first bank of switching means for selectively coupling individual of said inverter output terminals to said first inverter input terminal, a second bank of switching means for selectively coupling individual of said inverter output terminals to said second inverter input terminal, and a plurality of regenerating means associated with said inverter switching means for providing alternate current conduction paths for motor load current when one bank of said associated switching means is commutated; a commutation circuit comprising first inductive reactance means in circuit with one output terminal of said DC source and said first input terminal of said inverter network, second inductive reactance means in circuit with the other output terminal of said DC source and said second input terminal of said inverter network, capacitive reactance means having a first terminal and a second terminal, respectively, and switching means for alternatively switching said capacitive reactance means between one output of said DC source and the complementary input of said inverter network; and control means for selectively switching said switching means of said inverter network to generate a three-phase output voltage for said motor, and for selectively switching said commutation circuit switching means to couple said capacitive reactance means across the bank of inverter network switching means being commutated whereby said capacitive reactance means supplies a reverse bias to the inverter switching means being commutated and charges to a potential of opposite polarity for supplying a reverse bias to the complementary bank of inverter switching means during the next commutation period, one of said commutating circuit inductive reactances cooperates with said capacitive reactance to charge said capacitive reactance after said reverse bias has been applied to the bank of inverter switching means being commutated, the charging time of said capacitive reactance being determined by the values of said inductive reactance and said capacitive reactance, and the other of said commutation circuit inductive reactances conducts the load current circulating through said regenerating means, said first and second input terminals of said inverter network are relatively positive and relatively negative respectively, said commutation circuit further comprising first unidirectional current conduction means associated with said first inductive reactance of sad commutation circuit for limiting the positive voltage applied to said first inverter input terminal to the positive voltage received from said DC source; and second unidirectional current conduction means associated with said second inductive reactance of said commutation circuit for limiting the negative voltage applied to said second inverter input terminal to the negative value received from said DC source.

2. A control system for controlling the speed of a three-phase induction motor, comprising: a source of DC potential; a three-phase inverter network defining first and second input terminals and first, second, and third output terminals coupled to said motor, said inverter comprising a plurality of switching means including a first bank of switching means for selectively coupling individual of said inverter output terminals to said first inverter input terminal, a second bank of swtching means for selectively coupling individual of said inverter output terminals to said second inverter input terminal, and a plurality of regenerating means associated with said inverter switching means for providing alternate current conduction paths for motor load current when one bank of said associated switching means is commutated; a commutation circuit comprising first inductive reactance means in circuit with one output terminal of said DC source and said first input terminal of said inverter network, second inductive reactance means in circuit with the other output terminal of said DC source and said second input terminal of said inverter network, capacitive reactance means having a first terminal and a second terminal, respectively, and switching means for alternatively switching said capacitive reactance means between one output of said DC source and the complementary input of said inverter network; and control means for selectively switching said switching means of said inverter network to generate a three-phase output voltage for said motor, and for selectively switching said commutation circuit switching means to couple said capacitive reactance means across the bank of inverter network switching means being commutated whereby said capacitive reactance means supplies a reverse bias to the inverter switching means being commutated and charges to a potential of opposite polarity for supplying a reverse bias to the complementary bank of inverter switching means during the next commutation period, one of said commutating circuit inductive reactances cooperates with said capacitive reactance to charge said capacitive reactance after said reverse bias has been applied to the bank of inverter switching means being commutated, the charging time of said capacitive reactance being determined by the values of said inductive reactance and said capacitive reactance, and the other of said commutation circuit inductive reactances conducts the load current circulating through said regenerating means, said switching means having first, second, third and fourth thyristors, said first thyristor adapted to couple said capacitive reactance first terminal to an input of said inverter network of one polarity, said second thyristor adapted to couple said capacitive reactance second terminal to an output terminal of said DC source of opposite polarity, said third thyristor adapted to couple said capacitive reactance first terminal to the opposite-polarity terminal of said inverter, and said fourth thyristor adapted to couple said capacitive reactance second terminal to the same-polarity terminal of said DC source, said control means energizing said first and second thyristors simultaneously and exclusive of said third and fourth thyristors, and a first reactive means in circuit with said second thyristor and a second reactive means in circuit with said third thyristor for limiting the rate of increase of voltage across said thyristors in said commutation circuit.

3. A commutation circuit for use with a three-phase inverter defining first and second input terminals and first, second and third output terminals, said inverter including a first bank of switching means each having a first terminal coupled to the input of said inverter and a second terminal coupled respectively to the output terminals of said inverter, and a second bank of switching means, each having a first terminal coupled respectively to the output terminals of said inverter and a second terminal coupled to said second input terminal of said inverter, a first set of regenerating diodes, each of said diodes being associated with one of said switching means of said first bank of switching means and each having a first terminal connected in common, a second set of regenerating diodes, each of said second bank of diodes associated with one of said switching means of said second bank of switches and having a terminal connected in common, comprising: means defining first and second input terminals and first and second output terminals; a first inductor in circuit with said first input terminal and said first output terminal of said commutation circuit; a second inductor coupled between said second input terminal and second output terminal of said commutation circuit; capacitive means; first commutation switching means adapted to couple said capacitive means between said second input terminal and said first output terminal; second commutation switching means adapted to couple said capacitive means in circuit with said first input terminal and said second output terminal; means coupling said first output terminal of said commutation circuit to said first input terminal of said inverter; means coupling the common junction of said second set of regenerating diodes of said inverter to said second input terminal of said commutation circuit, a first diode and resistor connected across said first inductor of said commutation circuit for limiting the output voltage of said first output terminal of said commutation circuit to the voltage appearing on said first input terminal of said commutation circuit; and a second resistor and a second diode connected in circuit with said second inductor of said commutation circuit for limiting the voltage of said second output terminal of said commutation circuit to the voltage appearing on the second input terminal of said commutation circuit.

4. The structure of claim 3 further comprising third reactance means connected in circuit with said first commutation circuit switching means for limiting the rate of rise of voltage across said second switching means; and fourth reactance connected in circuit with said second commutation circuit switching means for limiting the rate of rise of voltage across said second commutation circuit switching means.

References Cited

UNITED STATES PATENTS

| | | | |
|---|---|---|---|
| 3,219,905 | 11/1965 | Davis et al. | 321—45 XR |
| 3,262,036 | 7/1966 | Clark et al. | 318—227 |
| 3,340,453 | 4/1967 | Bradley et al. | 321—45 XR |
| 3,388,310 | 6/1968 | Etter | 321—45 XR |
| 3,406,325 | 10/1908 | Rosa | 318—227 XR |

ORIS L. RADER, Primary Examiner

G. RUBINSON, Assistant Examiner

U.S. Cl. X.R.

318—138, 230; 321—45